United States Patent [19]

Schwarz

[11] Patent Number: 4,840,674
[45] Date of Patent: Jun. 20, 1989

[54] INK COMPOSITIONS

[75] Inventor: William M. Schwarz, Webster, N.Y.

[73] Assignee: Xerox Corporation, Stamford, Conn.

[21] Appl. No.: 56,202

[22] Filed: Jun. 1, 1987

[51] Int. Cl.$^4$ ............................................ C09D 11/02
[52] U.S. Cl. ........................................ 106/22; 106/20
[58] Field of Search ................................. 106/22, 20

[56] References Cited

U.S. PATENT DOCUMENTS

| | | | |
|---|---|---|---|
| 4,295,889 | 10/1981 | Eida et al. | 106/22 |
| 4,309,180 | 1/1982 | La Croix et al. | 8/609 |
| 4,325,735 | 4/1982 | Ohta et al. | 106/22 |
| 4,395,287 | 7/1983 | Kobayashi et al. | 106/20 |
| 4,395,288 | 7/1983 | Eida et al. | 106/22 |
| 4,396,429 | 8/1983 | Matsumoto et al. | 106/20 |
| 4,585,484 | 4/1986 | Haruta et al. | 106/22 |
| 4,599,112 | 7/1986 | Yokoyama et al. | 106/22 |
| 4,689,078 | 8/1986 | Koike et al. | 106/22 |

FOREIGN PATENT DOCUMENTS 571A   8/1983   Japan ..................................... 106/22

Primary Examiner—Paul Lieberman
Assistant Examiner—Christine A. Skane
Attorney, Agent, or Firm—Eugene O. Palazzo; Judith L. Byorick

[57] ABSTRACT

An improved ink composition comprised of a major amount of water; an organic solvent selected from the group consisting of tetramethylene sulfone; 1,1,3,3-tetramethyl urea; 3-methyl sulfolane; and 1,3-dimethyl-2-imidazolidone; which solvent has permanently dissolved therein spirit soluble dyes such as black, yellow, cyan, magneta, brown, and mixtures thereof.

18 Claims, No Drawings

INK COMPOSITIONS

BACKGROUND OF THE INVENTION

The present invention is generally directed to ink compositions, and more specifically the present invention is directed to specific compositions useful in ink jet printing systems, and to processes for the preparations thereof. Accordingly, in one embodiment of the present invention there are provided aqueous ink compositions comprised of certain dyes with solubility in the solvent selected, and substantial insolubility in water. Therefore, in one preferred embodiment of the present invention the ink compositions are comprised of water, specific organic solvents inclusive of Sulfolane®, and spirit solvent dyes with solubility in the aforementioned solvents and substantial insolubility in water. The ink compositions of the present invention in addition to possessing the improved characteristics indicated hereinafter, such as excellent waterfasteness, are useful in various imaging and printing processes inclusive of thermal ink jet or bubble jet wherein the ink is heated to its boiling temperature enabling the injection of a bubble, reference U.S. Pats. Nos. 4,243,994; 4,325,735; and 4,396,429, the disclosures of which are totally incorporated herein by reference; as well as British Patent Publications Nos. 2,007,162 and 2,060,499, the disclosures of which are totally incorporated herein by reference.

Compositions which are useful in ink jet printing systems are well known, and generally contain water soluble dyes. There is thus disclosed, for example in U.S. Pat. No. 3,846,141, an ink composition useful in jet printing comprised of an aqueous solution of a water-soluble dye; and a humectant material formed of a mixture of a lower alkoxy triglycol and at least one other compound selected from the group consisting of a polyethylene glycol, a lower alkyl ether of diethylene glycol, and glycerol. The humectant system disclosed in this patent substantially prevents or minimizes tip drying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inches, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example, paper; and is controlled to form printed characters in response to video signals derived from an electronic character generator and in response to an electrostatic defletion system.

Furthermore, there are illustrated in U.S. Pat. No. 4,295,889 recording liquid ink compositions, and more specifically liquid compositions for use in a recording system wherein the liquid recording component is jetted from a small orifice in a form of a droplet. According to the disclosure of this patent the recording liquid composition comprises a compound of the general formula (A) as illustrated in column 3, beginning at line 30, or compound of the general formula (B), reference column 3, beginning at line 47, which components are referred to as dye compounds, see column 4, line 28. Example of numerous dyes are provided beginning at column 4, line 51, and continuing on to column 42 for example. In column 43, beginning at line 29, of the U.S. Pat. No. 4,295,889 there are disclosed examples of water soluble organic solvents useful as a carrier component together with water, which solvents include alkylene glycols containing 2 to 6 carbon atoms in the alkylene moiety; and moreover, it is stated in column 44, beginning at line 8, that the properties of the liqquid developer may be further improved by adding additives including nitrogen containing compounds such as 1,3-dimethyl-2-imidazolidinone, see column 44, line 22. Other patents containing similar teachings include U.S. Pat. Nos. 4,325,735; 4,395,287; 4,395,288; and 4,396,429. There is no disclosure in these references however, with respect to ink compositions containing spirit soluble dyes with, for example, higher solubility in certain nonvolative organic solvent phase than in water thereby avoiding ink clogging caused primarily because of water evaporation. Thus, with the inks of the present invention, ink jet clogging is avoided and other advantages are achievable especially because, for example, of the intrinsic low water solubility or insolubility of the spirit soluble dyes which enables, for example, improved waterfastness characteristics as compared to inks wherein typical water soluble acid dyes and direct dyes are selected. Furthermore, the ink composition of the present invention with the spirit soluble dyes permit the presence of greater quantities of the organic phase solvent in the aforementioned inks, for example up to 80 percent, thereby rendering these inks susbstantially more compatible with typical transparency materials.

Also, there is disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition containing an aqueous solution of a watersoluble dye and a humectant consisting of at least one water-soluble unsaturated compound. Further, there is disclosed in U.S. Pat. No. 4,267,088 coatings particularly useful as marking inks wherein there is selected an epichlorohydron - modified polyethylenimine, and an ehtylene oxide modified polyethylenimine in an aqueous solution. Other patents of intereat are U.S. Pat. Nos. 4,101,329; 4,290,072; 4,383,859; 4,235,773; 4,279,814; 4,443,371; 4,286,989; 4,299,630; 4,167,393; 3,864,296; 4,238,234; 3,234,025; 4,520,143; 3,920,855; and 4,182,612.

Additionally, there is disclosed in U.S. Pat. No. 4,197,135 ink compositions with improved waterfastness comprised of at least one water soluble dye, and a polyamine with 7 or more nitrogen atoms per molecule. Specifically, there is illustrated in this patent an ink composition comprising an aqueous solution of at least one water-soluble dye, and about 0.5 percent to about 10 percent by weight concentration of a polyamine having 7 or more nitrogen atoms per molecule; and wherein the composition has a pH of 8 or above. In column 1, beginning at line 61, of this patent it is indicated that the preferred polyamines have the hydrogen of the primary amine group replaced with either a methyl or a hydroxyethyl group. Examples of fully substituted polyamines selected are outlined in column 2, beginning at line 40, of the U.S. Pat. No. 135.

Further, there is disclosed in U.S. Pat. No. 4,659,382 entitled "Waterfast Ink Jet Compositions and Process", the disclosure of which is totally incorporated herein by reference, ink compositions comprised of hydroxylated polyethylenimines, dyes and water. More specifically, there are described in this patent inks with a major amount of water, a hydroxyethylated polyethylenimine polymer, and a dye component wherein the polymer has incorporated therein from about 65 percent by weight to about 80 percent by weight of hydroxyethyl groups. Additionally, illustrated in U.S. Pat. No. 4,664,708 entitled "Waterfast Ink Compositions", the disclosure of which is totally incorporated herein by reference, are ink compositions comprised of water and a polymeric dye comprised of water soluble polymers with highly stable chromophores covalently bonded thereto. Specifically, there are described in this patent inks with a major amount of water, and a polymeric dye comprised of the reaction product of a water soluble polymer with a reactive dye.

Although many of the above compositions are suitable for their intended purposes, there continues to be a need for other ink compositions and processes thereof. Specifically, there is a need for ink jet compositions with excellent waterfastness characteristics, and wherein, for example, the dyes selected are retained in solution rather than forming as precipitates, and thereby causing clogging of the ink jet nozzles. Additionally, there is a need for ink compositions with excellent color intensities, and wherein, for example, the amount of dyes selected can be deacresed for example only about 1 percent of dye is needed with the inks of the present invention in some situations as compared to about 3 to 5 percent with the direct dyes of the prior art. Furthermore, there is a need for ink compositions wherein the waterfastness is greater than about 80 percent. Also, the inks of the present invention possess other desirable characteristics including acceptable viscosity parameters, suitable surface tension values, excellent color intensity especially with respect to the black inks; and these inks enable the retention of the dye molecules therein thereby preventing percipitation and undesirable clogging of the ink jet nozzles. Other important characteristics associated with the inks of the present invention include the enablement of permanent transparency formation, and the continued solubility of the inks including solubility subsequent to evaporation of the water contained therein.

SUMMARY OF THE INVENTION

It is an object of the present invention to provide ink compositions with the improved characteristics illustrated herein.

In another object of the present invention there are provided ink compositions with improved waterfastness.

Another object of the present invention resides in the provision of ink compositions with solvent soluble spirit dyes.

Further, in another object of the present invention there are provided ink compositions comprised of certain organic solvents with soluble spirit dyes permanently therein, which dyes are substantially insoluble in water.

An additional object of the present invention resides in the provision of black ink compositions, and colored ink compositions with improved waterfastness characteristics, and acceptable color resolution.

Furthermore, in a specific object of the present invention there are provided aqueous ink compositions comprised of Sulfolane ® solvents with dyes therein that are substantially insoluble in water.

In still another object of the present invention there are provided processes for the preparation of ink compositions.

Additionally, in another object of the present invention there are provided ink compositions particularly useful in ink jet printing processes inclusive of thermal and bubble jet methods.

In a further object of the present invention there are provided ink compositions with spirit soluble dyes which are substantially insoluble in aqueous mediums, and which inks possess high surface tension characteristics and low viscosity values.

Another object of the present invention resides in the provision of ink compositions with a surface tension of from about 45 to about 60 dynes/cm, and viscosities of from about 2 to about 6 centipoise prior to evaporation of the water from the inks of the present invention, and with a viscosity of from about 12 to about 20 centipoise subsequent to evaporation of water from the ink compositions illustrated herein.

Moreover, in another object of the present invention there are provided transparencies comprised of a supporting substrate containing thereover as a coating the ink compositions of the present invention.

These and other objects of the present invention are accomplished by the provision of ink compositions for jet printing, which compositions are comprised of organic solvents with dyes therein. More specifically, in one embodiment the ink compositions of the present invention are comprised of water, organic solvents, inclusive of Sulfolanes ®, imidazolidione, and certain ureas; and dyes soluble in the organic solvent but substantially insoluble in water.

In an embodiment of the present invention the ink composition is comprised of major amount of water; from about 10 percent by weight to about 90 percent by weight of the organic solvent tetramethylene sulfone, commercially available as Sulfolane ® and from about 0.5 percent by weight to about 5 percent by weight of a spirit soluble dye selected from the group consisting of black, cyan, magenta, brown, and yellow components, or mixtures thereof; and wherein the dye is substantially soluble in the Sulfolane ®, and substantially insoluble in water. Additionally, the inks of the present invention can be comprised of from about 10 to about 90 percent by weight of water, from about 90 to about 10 percent by weight of an organic solvent or mixtures thereof, and from about 0.5 percent by weight to about 5 percent by weight of a spirit soluble dye. A specific preferred ink composition of the present invention is comprised of about 60 percent by weight of water, 40 percent by weight of the organic solvent tetramethylene sulfone, and as an added component from about 0.5 to about 5 percent by weight of a spirit soluble dye. When mixtures of solvents are selected, generally there can be utilized mixtures of the Sulfolanes ® as illustrated herein, mixtures of Sulfolanes ® with N-methyl pyrrolidone, and the like. Mixtures of solvents include effective amounts of components providing the objectives of the present invention are achievable, however, generally for example there can be selected from about 20 to about 30 percent by weight of first solvent such as Sulfolane ®; and from about 10 to about 15 percent by weight of a second, or third solvent providing the objectives of the present invention are achievable.

Thus, the ink compositions of the present invention can be comprised of a major amount of water; an organic solvent selected from the group consisting of tetramethylene sulfone, 1,1,3,3 tetramethyl urea; 3 methyl sulfolane; and 1,3 dimethyl-2-imidazolidone, which solvent has permanently dissolved therein spirit soluble dyes selected from the group consisting of black, yellow, cyan, magenta, brown and mixtures thereof.

Various solvents or mixtures thereof can be selected for the inks of the present invention providing the objectives thereof are achievable. Important characteristics relating to the selection of an appropriate solvent include complete compatibility with water; desirable vapor pressures, that is for example, less than 0.1 millimeter of mercury (Hg); low toxicity properties; desirable intrinsic viscosities, for example, less than about 10 centiposie; high surface tension values exceeding, for example, greater than 30 dynes/centimeter; and further, which solvents will enable the substantially complete dissolution of the dye components. Specific examples of organic solvents, usually present in an amount of from about 10 percent by weight to about 90 percent by weight, selected for the ink compositions of the present invention include tetramethylene sulfone, available as Sulfolane ®; 1,1,3,3-tetramethyl urea; 3-methyl sulfolane; 1,3-dimethyl-2-imidazolidone; and the like. A particularly preferred solvent, since it posseses many desirable properties inclusive of substantially no toxicity characteristics, is tetramethylene sulfone. Other solvents may be selected providing the objecties of the present invention are achievable including, for example formamides, and the like.

There is generally incorporated into the ink compositions of the present invention dyes that are substantially or completely soluble in the organic solvent, and substantially insoluble in water. Thus, for example, the spirit soluble dyes of the present invention have a solubility in the organic solvent of at least 2 grams per 100 milliliters. In contrast, the solubility of the dyes selected for the inks of the present invention in water is very minimal, and at the very most about 1 gram per 100 milliliters. In most situations, the dyes for the inks of the present application have no solubility in water, that is about 0 grams per 100 milliliters of solvent. Accordingly, specific spirit soluble dyes of incorporation into the ink compositions of the present invention are Orasol Black RL or intraplast Black RL/Solvent Black 29, Lapranol Black BR, Savinyl Black RLS, Orasol Black RLP, nd Neozapon Black; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, and mixtures thereof; and the like. Examples of preferred dyes are Orasol Black RL, Savinyl Black RLS, Direct Brilliant Pink B, Savinyl Yellow RLS, intraplast Yellow 2GLN (Solvent Yellow 88), and Orasol Blue GN.

The aforementioned dyes are added to the ink compositions in effective amounts. Thus, for example, from about 0.5 percent by weight to about 5 percent by weight, and preferably from about 1 percent by weight to about 2 percent by weight of the dye component is selected. Other amounts of dye components can be utilized depending on the color intensity desired, for example, dye availability, cost, toxic charateristics thereof, and solubility in the organic solvent selected.

The ink compositions of the present invention also include therein water, preferably distilled water, generally in an amount of from about 10 percent by weight to about 90 percent by weight, and preferably in an amount of from about 30 percent by weight to about 60 percent by weight. Another preferred ink composition of the present invention is comprised of from about 60 to about 70 percent by weight of water and from about 30 to about 40 percent by weight of the Sulfolane ® solvent, which composition has added thereto from about 0.5 to about 5 percent by weight of a spirit soluble dye. Moreover, with respect to the aforementioned ink compositions there can be selected mixtures of solvents including, for example, from about 10 to about 15 percent by weight of N-methyl pyrrolidone, and 25 percent by weight of Sulfolanes ®, which inks include therein, when 10 percent by weight of the pyrrolidone is present, 65 percent by weight of water.

With the ink compositions of the present invention, the dye is permanently retained in the ink mixture, therefore, for example no precipitates of the dye result thereby substantially eliminating any of the problems associated with the undesirable clogging of the ink jets. Additionally, many compositions of the present invention posses other important properties including a waterfastness of from about 80 to about 95 percent, a pH of from about 4 to about 7, a surface tension of from about 30 dynes/cm to about 69 dynes/cm, a viscosity of from 3 to about 5 centipoise; and further, images with acceptable color intensity and superior resolution result when these inks are incorporated into ink jet printing processes.

Additive components in amounts of from about 5 to about 15 percent by weight may be included in the ink compositions of the preset invention such as surfactants such as polyethyoxy alcohol, biocides, chelating agents, such as the sodium salts of ethylene diamine tetra acetic acid, and buffer solutions, which additives are illustrated in the patents referred to hereinbefore. Specifically, thus for example, there can be selected as surfactants polyethylene derivatives of long chain alkyl amines, alcohols, alkylphenols, fatty acid esters. Examples of biocides are Dowcide, and buffer solution examples include ammonium acetate/aluminum hydroxide and the like. With the inks of the present invention, it is preferred that no surfactants or chelating agents be incorporated therein.

Formulation of the ink compositions described herein is accomplished by the simple admixing of the components, including for example water, the organic solvent, and the dye components. In one specific embodiment of the present invention, the ink compositions are prepared by, for example, dissolving a sufficient amount of dye in a substantially saturated solution of organic solvent. Thereafter, the solution is mixed at room temperature, followed by filtration, for example, utilizing a three micron filter for the purpose of removing insoluble impurities and any undissolved dye material. Subsequently, the final ink composition is formulated by simply adding an appropriate amount of distilled water and pure solvent, such as Sulfolane ®, resulting in an ink that preferably has contained therein 2 percent by weight of dye, 40 percent by weight of Sulfolane ®, and 60 percent by weight of water. Other similar methods of preparation can be selected including specifically the admixing of water with the solvent, followed by the addition of the spirit soluble dye, and the admixing of water with solvent mixtures, followed by the addition of a spirit soluble dye. With further respect to the inks of the present invention, there can be selected water soluble dyes which have been converted to spirit soluble dyes, reference the magenta dye illustrated in working Example II. Additionally, as indicated herein there are encompassed within the present invention transparencies comprised of a supporting substrate of, for example, polysulfones containing thereover as a coating the ink compositions illustrated herein comprised of a major amount of water, the specific organic solvents recited, and dissolved therein spirit soluble dyes. The supporting substrate thickness of the transparency depends on a number of factors including the components selected. Generally, however, this substrate is of a thickness of from about 3 to about 5 mils.

The following examples are being supplied to further define specific embodiments of the present invention, it being noted that these examples are intended to illustrate and not limit the scope of the present invention. Parts and percentages are by weight unless otherwise indicated.

EXAMPLE I

There was prepared a black ink composition by the following procedure. In a 100 milliliter flask, 4 grams of the black dye Orasol Black RLP were mixed for about 4 hours with 30 grams of the organic solvent tetramethylene sulfone, available as Sulfolane ® from Phillips Petroleum. Thereafter, the resulting solution was filter through a 3 micron filter to remove a very slight amount of residue, and the filtrate obtained was then diluted with an additional 47 grams of Sulfolane ®, 118 grams of water, and 20 grams of N-methyl pyrrolidone. There resulted a final ink composition containing 2 percent of Orasol Black RLP dye, 35 percent of Sulfolane ®, 10 precent of N-methyl pyrrolidone, and 53 percent of water.

This ink had a waterfastness of 95 percent on silica coated Diablo paper as determined by measuring the optical densities prior to, and subsequent to immersing the ink as a coating on paper in water for 10 minutes with stirring. The waterfastness value is the ratio of the optical density after immersing into water, and before immersing into water.

Additionally, this ink had the following characteristics:
Surface Tension: 48 dynes/centimeter
Visosity: 3.5 centipoise
Frequency Response: 5 kilohertz
Latency Time: 600 seconds
Heater Life: greater than $10^7$ drops Frequency response refers to the rate at which the ink composition drops can be emitted from an ink jet nozzle, while latency times refers to the time a given ink jet concentration remains inoperative (quiescent state) at a relatively low relative humidity of about 10 percent. Heater life refers to the number of drops that can be generated without burnout or loss of drop characteristics.

EXAMPLE II

There was prepared a magenta ink composition by the following procedure. In a 250 mil flask, 21 grams of the megenta dye Direct Brilliant Pink B (C.I. Direct Red No. 9) were mixed with 21 grams of diphenyl guanidinium sulfate and 161 grams of the organic solvent tetramethylene sulfone, available as Sulfolane ®. Thereafter, the resulting solution was heating to 60° C. with stirring for four hours, which substantially dissolved the original magenta chromophoric material, and precipitated a quantity of crystalline white salt consisting essentially of sodium sulfate. The resultant solution was fitered through a 3 micron filter to separate the white precipitate from the dry filtrate. The nominal composition of the filtrate was 11.4 percent Direct Red No. 9 and 88.6 percent Sulfolane ®. To 10 grams of the filtrate were added 3 grams of N-methyl pyrrolidone, 12 grams of additional Sulfolane ®, and 13.9 grams of water to provide a final ink composition of 3.8 percent of the diphenyl guanidinium salt of Direct Red No. 9 dye; 10.0 percent N-methyl pyrrolidone, 40.0 percent Sulfolane ®, and 46.2 percent water.

This ink possessed a high surface tension of 52 dynes/centimeter and a viscosity of 2.5 centipoise. Heater deposits were negligible at least up to $10^7$ pulses, and latency was about 800 seconds at room temperature and 10 percent relative humidity. A waterfastness of 80 percent was achieved on Diablo silica paper several days after printing.

EXAMPLE III

Two grams of the commercial dye Aizen Spilon Yellow CGNH, a spirit soluble solvent dye essentially insoluble in water, available from Hodogaya Chemical Company, Ltd., were mixed with 18 grams of the Sulfolane ® solvent in a 100 milliliter flask, heated to 100° F. for 10 minutes, then filtered through a 31 micron filter. The resulting filtrate, 17.9 grams, was then mixed with 0.9 gram of Sulfolane ®, 21.5 grams of water, and 4.5 grams of N-methyl pyrrolidone yielding a final ink composition comprised of 4 weight percent of Aizen Spilon Yellow CGNH dye, 10 weight percent of N-methyl pyrrolidone, 38 weight percent of Sulfolane ®, and 48 percent of water. This ink yielded a bright process yellow color with a reflection density in excess of 1.2 when printed in a modified Diablo printer breadboard on Diablo silica coated paper. Furthermore, this ink had similar characteristics as the ink composition of Example 1. Further, with the ink of this Example as well as Example I, no clogging of the ink jets occurred, and moreover no image defects were observed.

EXAMPLE IV

An ink composition was prepared that was particularly useful in thermal ink jet processes as illustrated hereinbefore as follows. Two grams of the spirit soluble cyan dye Orasol Blue GN (C.I. 67) (Ciba-Geigy) was stirred with 25.4 grams of Sulfolane ® for six hours. The resultant solution was then diluted with 39 grams of water, stirred for one hour then filtered through a 3 micron filter. Subsequently, the resultant concentrated ink was diluted with the appropriate amount of a 40/60 solvent mix of Sulfolane ®, and water yielding an ink containing 1.5 percent of Orasol Blue GN, 40 percent of Sulfolane ®, and 58.5 percent of water.

This ink possessed similar properties as the ink of Example I. A solid area density of 1.30 was achieved on Diablo silica coated paper and insignificant heater deposits were found after $2 \times 10^7$ drops with the above prepared ink. Other important properties for this ink include a relatively high surface tension, 48 dynes/centimeter; a low viscosity, 2.5 centipoise; 84 percent waterfastness; and a nonmutagenic Ames test response.

Other modifications of the present invention may occur to those skilled in the art based upon a reading of the present disclosure, and these modifications are intended to be included within the scope of the present invention.

What is claimed is:

1. An ink composition comprised of a major amount of water; an organic solvent consisting essentially of a solvent selected from the group consisting of tetramethylene sulfone; 1,1,3,3-tetramethyl urea; and 3-methyl sulfolane; which solvent has permanently dissolved therein spirit soluble dyes selected from the group consisting of black, yellow, cyan, magenta, brown, and mixtures thereof, which dyes are substantially insoluble in aqueous media.

2. A composition in accordance with claim 1 wherein the organic solvent is tetramethylene sulfone.

3. A process in accordance with claim 1 wherein water is present in an amount of from about 20 percent by weight to about 80 precent by weight.

4. A composition in accordance with claim 1 wherein the organic solvent is present in an amount of from about 20 percent by weight to about 80 percent by weight.

5. A composition in accordance with claim 1 wherein the dye is present in an amount of from about 0.5 percent by weight to about 5 percent by weight.

6. A composition in accordance with claim 1 wherein the dye is selected from the group consisting of Orasol Black RL, Intraplast Black RL/Solvent Black 29, and Savinyl Black RLS.

7. A composition in accordance with claim 1 wherein the dye is selected from the group consisting of Savinyl Yellow 2 RLS, Savinyl Yellow RLSN, Intraplast Yellow 2GLN, Neozapon Yellow 081, Neozapon Yellow 141, Zapon Yellow 100, Zapon Yellow 157, Savinyl Yellow RLS; Neozapon Red 492, Direct Brilliant Pink B, Savinyl Pink 6 BLS, Savinyl Red 3 BLS, Orasol Red 2 BL, Intraplast Red G, Savinyl Red BLSN, SAvinyl Scarlet RLS, Savinyl Fire Red 3GLS, Zapon Red 335; Orasol Blue 2 GLN, Neozapon Blue 807, Savinyl Blue RLS, Savinyl Blue GLS, Losol Blue; Zapon Brown 187, Savinyl Brown GLS; and mixtures thereof.

8. A composition in accordance with claim 1 wherein the waterfastness of the ink from about 80 percent to about 95 percent.

9. A composition in accordance with claim 1 with a viscosity of from about 2 to about 6 centipoise, and a surface tension of rom about 45 to about 60 dynes/centimeter.

10. A composition in accordance with claim 1 wherein distilled water is selected.

11. A composition in accordance with claim 1 further including therein additive components selected from the group consisting of surfactants, biocides, chelating agents, and buffer solutions.

12. An ink composition comprised of about 10 to about 90 percent by weight of water, from about 90 to about 10 percent by weight of a solvent consisting essentially of the solvent tetramethylene sulfone, which solvent has permanently dissolved therein spirit soluble dyes in an amount of from about 0.5 to about 5 percent by weight, which dyes are substantially insoluble in water.

13. A composition in accordance with claim 12 wherein the spirit soluble dyes are selected form the group consisting of back, yellow, cyan, magenta, brown, and mixtures thereof.

14. An ink composition comprised of a major amount of water; an organic solvent consisting essentially of a solvent selected from the group consisting of tetramethylene sulfone, 1,1,3,3-tetramethyl urea; and 3-methyl sulfolane; which solvent has permanently dissolved therein spirit soluble dyes, which dyes are substantially insoluble in aqueous media.

15. An ink composition comprising a major amount of water; an organic solvent consisting essentially of a mixture of N-methyl pyrrolidone and a solvent selected from the group consisting of tetramethylene sulfone; 1,1,3,3-tetramethyl urea; and 3-methyl sulfolane; which solvent has permanently dissolved therein spirit soluble dyes selected from the group consisting of black, yellow, cyan, magenta, brown, and mixtures thereof, which dyes are substantially insoluble in aqueous media.

16. An ink composition comprising about 10 to about 90 percent by weight by water, from about 90 top about 10 percent by weight of a solvent consisting essentially of a mixture of N-methyl pyrrolidone and the solvent tetramethylene sulfone, which solvent has permanently dissolved therein spirit soluble dyes in an amount of from about 0.5 to about 5 percent by weight, which dyes are substantially insoluble in water.

17. An ink composition comprising a major amount of water; an organic solvent consisting essentially of a mixture of N-methyl pyrrolidone and a solvent selected from the group consisting of tetramethylene sulfone; 1,1,3,3-tetramethyl urea; and 3-methyl sulfolane; which solvent has permanently dissolved therein spirit soluble dyes, which dyes are substantially insoluble in aqueous media.

18. A composition in accordance with claim 11, wherein the surfactants are selected from the group consisting of polyethoxyl alcohol; polyethylene derivaties of alkyl amines, alcohols, alkylphenols, and fatty acid esters; the chelating agents are sodium salts of ethylene diamine tetra acetic acid; and the buffer solutions contain ammonium acetate and aluminum hydroxide.

* * * * *